US007657350B2

(12) United States Patent
Moran (10) Patent No.: US 7,657,350 B2
(45) Date of Patent: Feb. 2, 2010

(54) METHOD OF CONTROLLING ENGINE STOP-START OPERATION FOR HEAVY-DUTY HYBRID-ELECTRIC AND HYBRID-HYDRAULIC VEHICLES

(75) Inventor: Brian D. Moran, La Mesa, CA (US)

(73) Assignee: ISE Corporation, Poway, CA (US)

( * ) Notice: Subject to any disclaimer, the term of this patent is extended or adjusted under 35 U.S.C. 154(b) by 0 days.

(21) Appl. No.: 11/948,760

(22) Filed: Nov. 30, 2007

(65) Prior Publication Data

US 2008/0097661 A1    Apr. 24, 2008

Related U.S. Application Data

(62) Division of application No. 11/289,069, filed on Nov. 29, 2005.

(60) Provisional application No. 60/632,046, filed on Dec. 1, 2004.

(51) Int. Cl.
*B60K 6/40* (2007.10)
*B60W 10/06* (2006.01)
*B60L 11/02* (2006.01)
*B60K 6/46* (2007.10)

(52) U.S. Cl. .................. 701/22; 701/112; 903/914; 180/65.275; 180/65.245

(58) Field of Classification Search .................. 701/22, 701/112; 180/65.275, 65.22–65.26; 903/914
See application file for complete search history.

(56) References Cited

U.S. PATENT DOCUMENTS 3,791,473 A    2/1974    Rosen

| 4,113,045 | A | * | 9/1978 | Downing, Jr. | 180/65.245 |
| 4,196,587 | A | * | 4/1980 | Shiber | 60/414 |
| 4,282,947 | A | * | 8/1981 | Kemper | 180/165 |
| 4,533,011 | A | * | 8/1985 | Heidemeyer et al. | 180/65.2 |
| 5,081,365 | A | * | 1/1992 | Field et al. | 290/45 |
| 5,327,992 | A | * | 7/1994 | Boll | 180/65.25 |

(Continued)

FOREIGN PATENT DOCUMENTS

JP    08308020 A    * 11/1996

OTHER PUBLICATIONS

Halliday, David. Fundamentals of physics. David Halliday, Robert Resnick, Jearl Walker., 6th ed. 2001, John Wiley & Sons, Inc. pp. 588-591, 598-601, 648-651.

(Continued)

*Primary Examiner*—Eric Bolda
*Assistant Examiner*—Ari M Diacou
(74) *Attorney, Agent, or Firm*—Stephen C. Beuerle; Procopio Cory Hargreaves & Savitch LLP (57) ABSTRACT

This invention relates to a Start-Stop method for a heavy-duty hybrid vehicle that turns off the internal combustion engine when the vehicle stops or, optionally, when the vehicle travels downhill. The Stop-Start method automatically restarts the internal combustion engine when the vehicle starts accelerating or is no longer traveling downhill. The software instructions for the Stop-Start method reside within the programming of the hybrid vehicle control computer as a subset of the hybrid vehicle control strategy in hybrid-electric or hybrid-hydraulic heavy-duty vehicle. During the time the internal combustion engine is turned off the necessary vehicle accessories operate from the available power of the hybrid high power energy storage.

24 Claims, 6 Drawing Sheets

U.S. PATENT DOCUMENTS

| | | | |
|---|---|---|---|
| 5,343,970 A | 9/1994 | Severinsky | |
| 5,402,046 A | 3/1995 | Jeanneret | |
| 5,568,023 A | 10/1996 | Grayer et al. | |
| 5,650,713 A | 7/1997 | Takeuchi et al. | |
| 5,669,842 A * | 9/1997 | Schmidt | 475/5 |
| 5,698,905 A | 12/1997 | Ruthlein et al. | |
| 5,713,427 A * | 2/1998 | Lutz et al. | 180/65.245 |
| 5,788,597 A | 8/1998 | Boll et al. | |
| 5,823,280 A * | 10/1998 | Lateur et al. | 180/65.235 |
| 5,841,201 A | 11/1998 | Tabata et al. | |
| 5,954,779 A | 9/1999 | Dietzel | |
| 5,996,722 A | 12/1999 | Price | |
| 6,018,694 A | 1/2000 | Egami et al. | |
| 6,038,500 A * | 3/2000 | Weiss | 701/22 |
| 6,098,733 A | 8/2000 | Ibaraki et al. | |
| 6,098,734 A | 8/2000 | Kawamura | |
| 6,114,775 A | 9/2000 | Chung et al. | |
| 6,131,538 A | 10/2000 | Hanai | |
| 6,166,449 A | 12/2000 | Takaoka et al. | |
| 6,170,587 B1 | 1/2001 | Bullock | |
| 6,209,672 B1 | 4/2001 | Severinsky | |
| 6,213,233 B1 | 4/2001 | Sonntag et al. | |
| 6,323,608 B1 | 11/2001 | Ozawa | |
| 6,360,834 B1 * | 3/2002 | Gauthier | 180/65.23 |
| 6,385,529 B1 * | 5/2002 | Minowa et al. | 701/96 |
| 6,406,102 B1 | 6/2002 | Arnold | |
| 6,459,980 B1 | 10/2002 | Tabata et al. | |
| 6,461,266 B1 | 10/2002 | Weisz | |
| 6,476,571 B1 | 11/2002 | Sasaki | |
| 6,481,516 B1 * | 11/2002 | Field et al. | 180/65.2 |
| 6,483,198 B2 | 11/2002 | Schmitz et al. | |
| 6,484,831 B1 * | 11/2002 | Gauthier | 180/65.225 |
| 6,484,833 B1 * | 11/2002 | Chhaya et al. | 180/65.225 |
| 6,487,477 B1 * | 11/2002 | Woestman et al. | 701/22 |
| 6,622,804 B2 | 9/2003 | Schmitz et al. | |
| 6,624,527 B1 | 9/2003 | Crombez et al. | |
| 6,672,415 B1 | 1/2004 | Tabata | |
| 6,700,213 B1 | 3/2004 | Wakashiro et al. | |
| 6,817,329 B2 | 11/2004 | Buglione et al. | |
| 6,961,654 B2 | 11/2005 | Boggs | |
| 2001/0039230 A1 | 11/2001 | Severinsky et al. | |
| 2002/0069000 A1 | 6/2002 | Nakao | |
| 2002/0096137 A1 * | 7/2002 | Kobayashi et al. | 123/179.4 |
| 2002/0142884 A1 | 10/2002 | Kitajima et al. | |
| 2002/0143441 A1 * | 10/2002 | Yamaguchi et al. | 701/22 |
| 2003/0073540 A1 | 4/2003 | Eguchi et al. | |
| 2003/0100395 A1 * | 5/2003 | Hiraiwa | 475/5 |
| 2003/0162631 A1 * | 8/2003 | Williams | 477/5 |
| 2003/0168263 A1 | 9/2003 | Botti et al. | |
| 2004/0030469 A1 | 2/2004 | MacBain | |
| 2005/0228553 A1 | 10/2005 | Tryon | |

OTHER PUBLICATIONS

Simon, "Update on ThunderVolt Series-Hybrid Propulsion Alternatives for Transit Buses", EVAA/EPRI Workshop, Hollywood Beach, FL (Dec. 10, 2002).

* cited by examiner

METHOD OF CONTROLLING ENGINE STOP-START OPERATION FOR HEAVY-DUTY HYBRID-ELECTRIC AND HYBRID-HYDRAULIC VEHICLES

CROSS-REFERENCE TO RELATED APPLICATIONS

This application is a divisional of U.S. patent application Ser. No. 11/289,069 filed Nov. 29, 2005, and claims the benefit of U.S. Provisional Application No. 60/632,046 filed Dec. 1, 2004 under 35 U.S.C. 119(e).

FIELD OF THE INVENTION

The field of the invention relates to the stop-start operation of a hybrid-electric or hybrid-hydraulic heavy-duty vehicle with a gross vehicle weight rating of 10,000 lbs or higher. The stop-start operation is also known as idle-stop operation.

BACKGROUND OF THE INVENTION

In typical heavy-duty vehicle applications, including those with hybrid drive systems, a rotating internal combustion engine includes multiple gear and/or pulley and belt power take-offs (PTOs) that operate the vehicle subsystems and accessories. As a result, turning off the engine causes the vehicle subsystems and accessories to be turned off.

It is desirable to eliminate engine idling at vehicle stops to, among other things, increase fuel economy, minimize noise, and minimize engine exhaust emissions pollution to improve the quality of the operating environment. This is especially true for transportation and delivery vehicles such as, but not limited to, urban transit buses, refuse collection trucks, and local package freight pick up and delivery vans that may experience hundreds of stops during daily operation.

A driver could manually turn off and turn on an engine when stopped and restarted; however, in addition to the problem of the vehicle subsystems and accessories not being operation, a typical electric starter motor for the internal combustion engine would wear out rather quickly because it is not designed for the hundreds of stop-starts per day of transportation, collection, and delivery vehicles.

SUMMARY OF THE INVENTION

An aspect of the present invention involves a method for controlling the automatic shut down or engine turn-off during vehicle stops and the automatic engine restart during vehicle startup acceleration.

In another aspect of the invention, a hybrid-electric vehicle has all or part of the vehicle propulsion power supplied by an electric motor and has an on board electric energy storage to assist the primary power unit during vehicle acceleration power requirements. The energy storage unit can be charged from available excess primary power and/or braking regeneration energy supplied from the electric motor/generator during electromagnetic braking deceleration (also known as braking regeneration). In this invention the energy storage unit also supplies power to operate vehicle accessory subsystems such as the air conditioning system, hydraulic system for steering, hydraulic system for lifting, compressed air system for brakes, electric fans, coolant pumps, and various 12 volt and 24 volt standard accessories.

The major hybrid-electric drive components are an internal combustion engine mechanically coupled to an electric power generator, an energy storage device such as a battery or an ultracapacitor pack, and an electrically powered traction motor mechanically coupled to the vehicle propulsion system. The vehicle has accessories that can be powered from the energy storage and vehicle operation does not require that the engine be running for stopping, standing, or startup acceleration. This aspect of the present invention applies to a heavy-duty vehicle with an engine mechanically connected to a generator, an energy storage subsystem, and an electric traction motor for vehicle propulsion. The generator, energy storage, and traction motor are all electrically connected to a high voltage power distribution network.

For a series hybrid-electric configuration the engine is only connected to the generator and not mechanically connected to the vehicle wheel propulsion.

For a parallel hybrid-electric configuration the engine and the electric traction motor are both mechanically connected to the vehicle wheel propulsion. Furthermore, the parallel configuration has an electric traction motor than can also act as a generator and includes the capability to mechanically decouple the engine-generator combination from the vehicle wheel propulsion; or the parallel configuration has the capability to mechanically decouple the engine from the electric motor traction propulsion and includes a separate generator-starter that is mechanically coupled to the engine and can be used to charge the energy storage system and start the engine hundreds of times per day.

In a further aspect of the invention, a hybrid-hydraulic vehicle has all or part of the vehicle propulsion power supplied by a hydraulic motor and has an on board hydraulic accumulator energy storage to assist the primary power unit during vehicle acceleration power requirements. The energy storage unit can be charged from available excess primary power and/or braking regeneration energy supplied from the hydraulic motor/pump during hydraulic braking deceleration. In this aspect the energy storage unit also supplies power, either directly for hydraulically powered accessories or indirectly through a hydraulic to electric generator, to operate vehicle accessory subsystems such as, but not limited to, the air conditioning system, hydraulic system for steering, hydraulic system for lifting, compressed air system for brakes, cooling fans, coolant pumps, and various 12 volt and 24 volt standard accessories.

The major hybrid-hydraulic drive components are an internal combustion engine mechanically coupled to hydraulic pump, a hydraulic accumulator energy storage device, and an hydraulically powered traction motor mechanically coupled to the vehicle propulsion system. The vehicle has accessories that can be powered from the energy storage and vehicle operation does not require that the engine be running for stopping, standing, or startup acceleration. This aspect of the present invention applies to a heavy-duty vehicle with an engine mechanically connected to a hydraulic pump, an energy storage subsystem, and a hydraulic traction motor for vehicle propulsion. The pump, energy storage, and traction motor are all hydraulically connected to a high pressure power distribution network.

For a series hybrid-hydraulic configuration the engine is only connected to the hydraulic pump and not mechanically connected to the vehicle wheel propulsion.

For a parallel hybrid-hydraulic configuration the engine and the hydraulic traction motor are both mechanically connected to the vehicle wheel propulsion. Furthermore, the parallel configuration has a hydraulic traction motor than can also act as a hydraulic pump and includes the capability to mechanically decouple the engine-pump combination from the vehicle wheel propulsion; or the parallel configuration has the capability to mechanically decouple the engine from the hydraulic motor traction propulsion and includes a separate electric or hydraulic generator-starter that is mechanically coupled to the engine and can be used to charge the low voltage energy storage system and start the engine hundreds of times per day.

BRIEF DESCRIPTION OF THE DRAWINGS

The accompanying drawings, which are incorporated in and form a part of this specification, illustrate the logic flow of the invention and its embodiments, and together with the description, serve to explain the principles of this invention.

DETAILED DESCRIPTION OF THE INVENTION

Figure 1A:
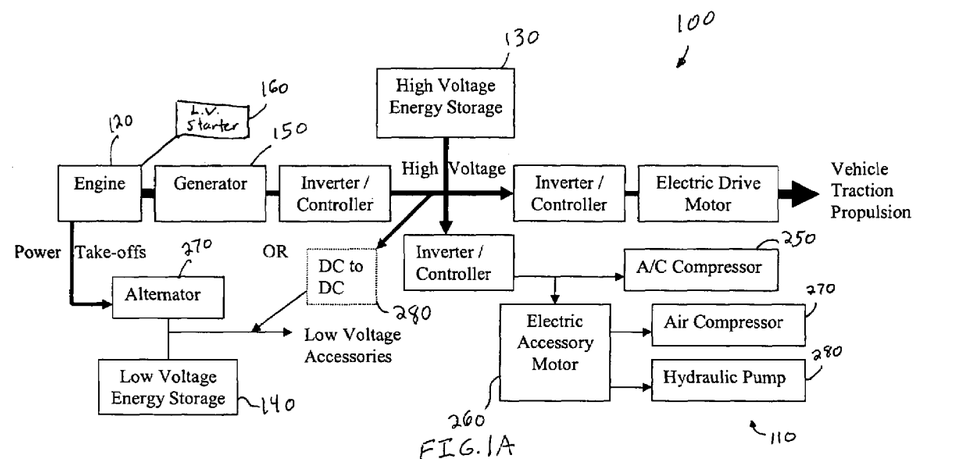
FIG. 1A is an block diagram of an embodiment of a series hybrid-electric drive system with electrically powered accessories.

With reference to FIG. 1A, an embodiment of a series hybrid-electric drive system 100 with electrically powered accessories 110 will be described. An engine 120 can be turned off because both the high voltage requirements and the low voltage requirements are met by respective energy storages 130, 140. A generator 150 is operated as a motor to spin the engine 120 during frequent restarts. A low-voltage engine starter 160 may be used infrequently to spin the engine 120 whenever the high-voltage energy storage 130 can not deliver enough power to the generator 150 for spinning the engine 120 during engine start. For example, in an implementation of this embodiment where ultracapacitors are used for energy storage, the low voltage starter 160 is used at the beginning of the day when the ultracapacitors are empty. The engine 120 may be any internal combustion engine that would be used to produce enough power to provide traction for propelling the vehicle.

Figure 1B:
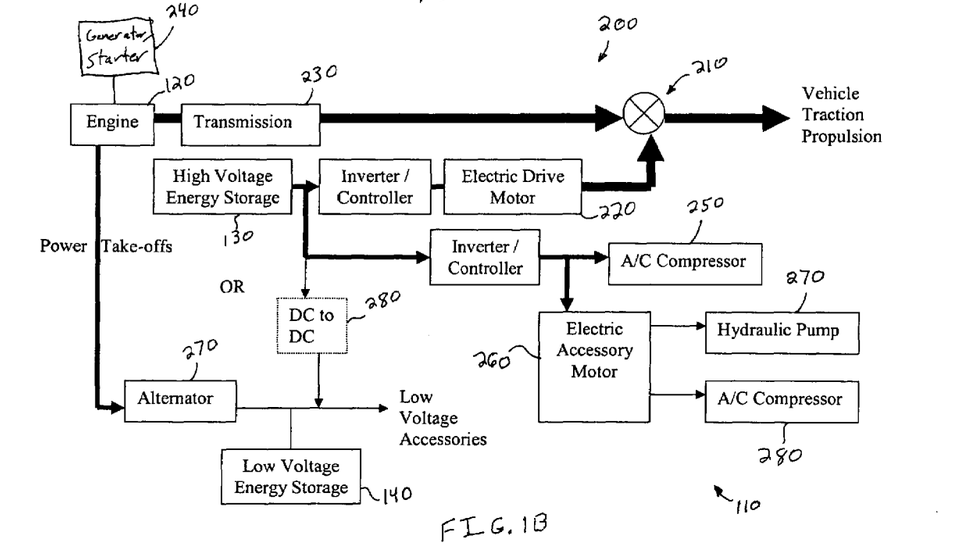
FIG. 1B is a block diagram of an embodiment of a parallel hybrid-electric drive system with electrically powered accessories.

With reference to FIG. 1B, an embodiment of a parallel hybrid-electric drive system 200 with electrically powered accessories 110 will be described. Again, the engine 120 can be turned off because both the high voltage requirements and the low voltage requirements are met by the respective energy storages 130, 140. FIG. 1B illustrates that the electric motor mechanical output and the engine mechanical output operate in parallel and are coupled together to add power and torque to traction propulsion drive train 210. In a typical implementation a motor 220 is located in front or behind a transmission 230 and turns the same mechanical torque shaft as the engine and transmission. In the Stop-Start or Idle-Stop method of the present invention, the engine 120 and the electric motor 220 must be able to decouple from the vehicle propulsion drive train 210 to allow the electric motor 220 to spin the engine 120 during engine startup. Alternatively, in place of, or in addition to a standard low voltage starter, a separate generator/starter 240 capable of hundreds of restarts per day is provided for the engine 120.

As illustrated in FIGS. 1A and 1B, an air conditioning (A/C) compressor 250 is assumed to include its own electric motor drive 260 similar to the air conditioning units used in fixed buildings. In the embodiments shown, the hydraulic pump and air compressor units 270, 280 are driven by the single electric motor 260, but in an alternative embodiment, each may have its own electric motor. The low-voltage requirements are supplied by either a Power Take-Off (PTO) alternator or generator 270, or a DC-to-DC converter 280 from the high voltage distribution buss. The low-voltage energy storage 140 is also shown in the diagrams, but may be unnecessary if the DC-to-DC converter 280 were used and there was always sufficient energy available to start the engine 120.

Figure 2:
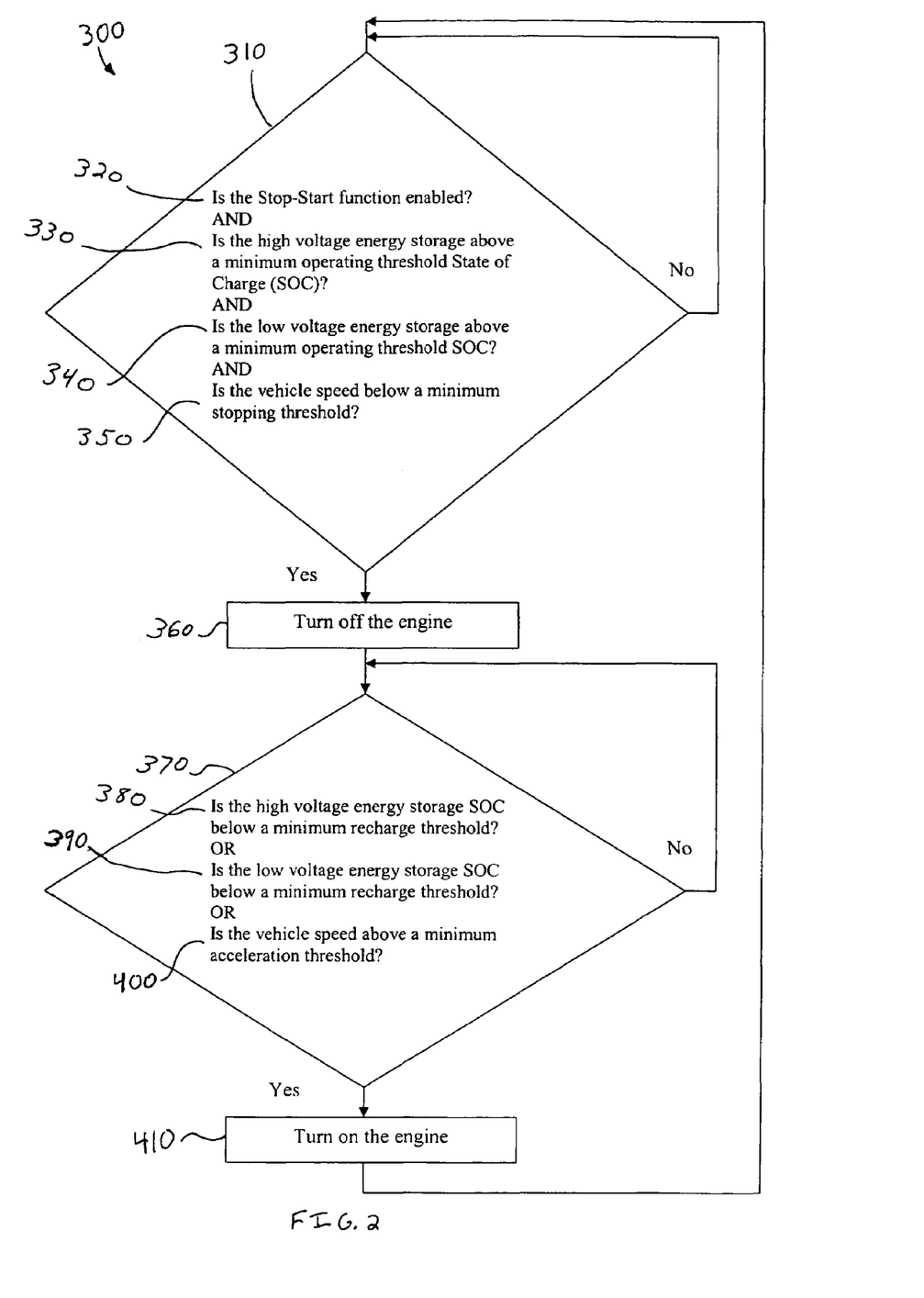
FIG. 2 is a flowchart of an exemplary stop-start control method.

With reference additionally to FIG. 2, an exemplary Stop-Start or Idle-Stop method 300 will be described. The method is embodied in the programmed software of the vehicle drive system control computer, which has the physical and protocol interfaces with the vehicle control and various component computers that control and report subsystem status. The software controls operation of the engine, generator, energy storage, and the drive system computer controllers to safely and efficiently turn off the engine 120 when the vehicle stops and restart the engine 120 when the vehicle starts moving again; thus, imitating the clean and quiet operation of a heavy duty electric powered vehicle (e.g., trolley bus).

At step 310, a determination is made as to whether the necessary conditions for turning off the engine 120 and keeping it turned off are met. First, because Stop-Start operation is not technically necessary to operate the vehicle, at step 320, a determination is made as to whether the Stop-Start or Idle-Stop function is enabled. Second, because the states of charge (SOC's) of the vehicle energy storage systems 130, 140 must be above minimum operating thresholds to sustain the accessory power requirements during a vehicle Stop-Start or Idle-Stop cycle, at steps 330, 340, a determination is made as to whether the states of charge (SOC's) of the vehicle energy storage systems 130, 140 must be above minimum operating thresholds to sustain the accessory power requirements during a vehicle Stop-Start or Idle-Stop cycle. The vehicle must be in a condition where it will not immediately need the traction power supplied by the engine 120 or engine/generator during the time required for at least one complete Stop-Start cycle. Thus, at step 340, a determination is made as to whether the vehicle speed is below a minimum "stop engine" threshold that would indicate that the vehicle is coming to a stop. In one or more additional embodiments, the method 300 may use time history information and route sensitive information from a vehicle location, and a route identification system that would allow the engine 120 to be turned off in noise-sensitive areas and during downhill travel when the engine 120 is not required.

During downhill travel in a standard drive system vehicle the engine 120 may use a "Jake" cylinder compression brake, the transmission may use a hydraulic compression "retarder", or an engine-transmission combination of a Jake brake and retarder may provide deceleration assistance. Because of this deceleration assistance and the PTO's for the control accessories, the engine 120 is not turned off when traveling downhill. In a hybrid-electric vehicle with electrically driven accessories 110 the engine 120 can be turned off because the deceleration assistance is provided by the braking regeneration drag of the electric propulsion motor on the drive train and the braking regeneration may provide enough power to run all the electrically driven accessories. When the electric energy storage 130 is full, braking regeneration power can be dissipated by braking resistors and by using the generator 150 to spin the engine 120 against its own compression. Additionally, while the engine is spinning by means of the generator and not consuming fuel, the engine may power any PTO accessories such as a low voltage alternator.

At step 360, the Stop-Start control computer stops the engine 120 by commanding the engine control unit to turn off the injection signals to the fuel injectors. Thus, the engine 120 turns off by stopping the engine fuel supply. If the engine 120 was stopped by either turning off the ignition or stopping the air intake there is a possibility of damaging the engine 120 during turn on because of a build up of unburned fuel in one or more of the engine cylinders. In the Stop-Start method 300, the ignition and air intake are left on.

At step 370, a check is made for any condition that would require an engine restart. First, at steps 380, 390, a determination is made as to whether either of the SOC's of the vehicle energy storage systems 130, 140 drops below minimum restart thresholds. If so, the engine 120 must restart. The restart thresholds are significantly below the operating thresholds so as to prevent an oscillation of the Stop-Start cycles. Second, if the vehicle needs more traction power than can be provided by the stored energy the engine 120 must restart to supply that power. At step 400, a determination is made as to whether the vehicle speed is above a minimum "start engine" threshold that would indicate that the vehicle is starting into launch acceleration. The "start engine" vehicle speed threshold is set far enough above the "stop engine" vehicle speed threshold to prevent Stop-Start cycle oscillation during normal operation of the vehicle. In one or more additional embodiments, the method 300 may use time history information and route sensitive information from a vehicle location, and a route identification system that would allow the engine to remain off in noise-sensitive areas and during downhill travel when the engine is not required. If any of these conditions 380, 390, 400 are met, at step 410, the engine 120 is turned on and control returns to step 310.

Figure 3:
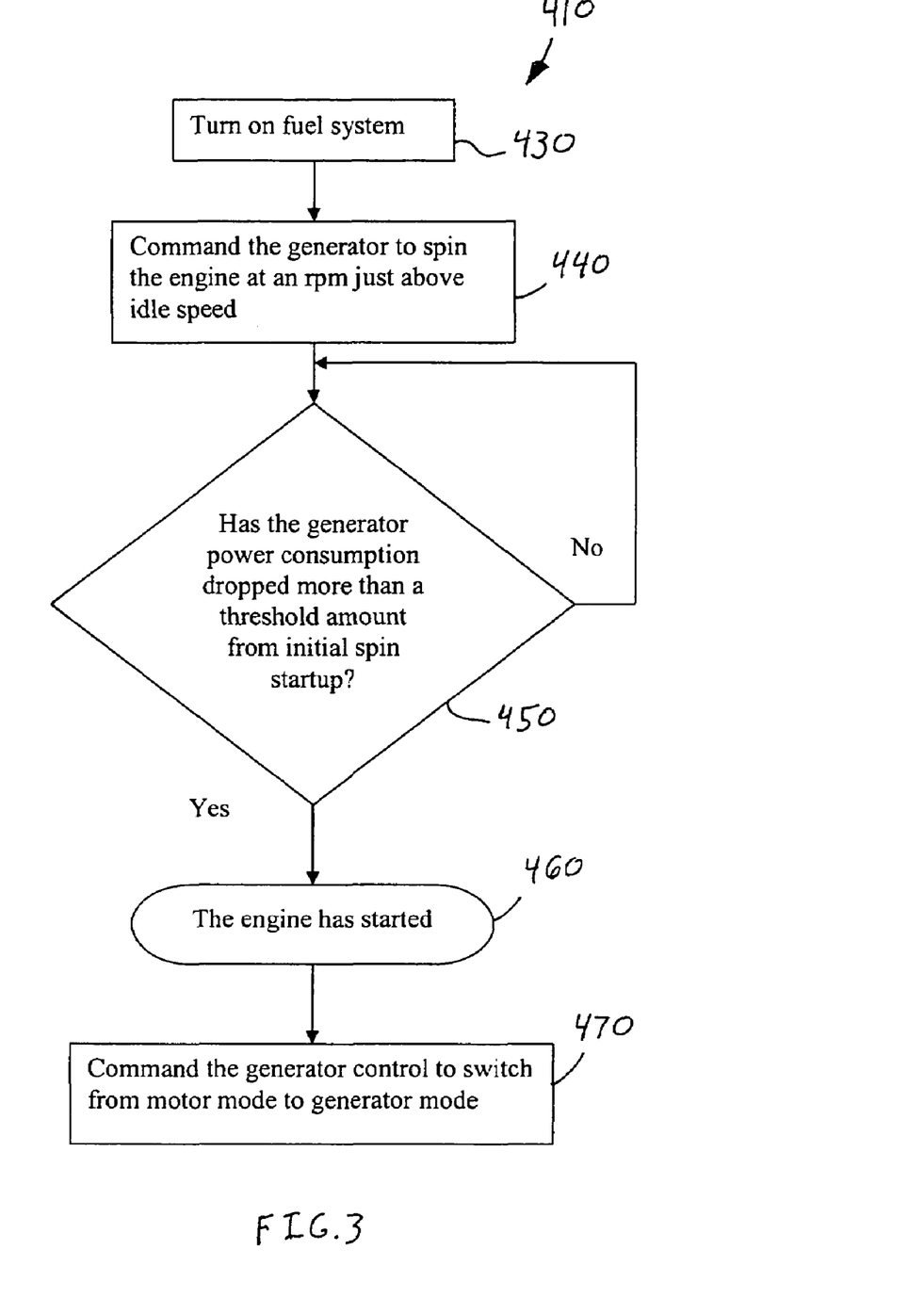
FIG. 3 is a flowchart of an exemplary engine turn-on sequence.

With reference to FIG. 3, the method 410 for turning on the engine 120 (without damaging the engine 120) will now be described. First, at step 430, is to turn on the fuel system by commanding the engine control unit to restore the signals to the fuel injectors.

Second, at step 440, is to spin the engine. In a series hybrid the generator is switched to a motor and draws power from the high voltage system to rotate the engine at an rpm above the engine idle rpm. In a parallel hybrid this function is performed by decoupling the motor from the drive train or by using a separate starter. Some modern engines have a heavy-duty low voltage alternator/generator that may function for this purpose if it is suitable to sustain the hundred of starts that may be required per day.

During the generator spinning of the engine 120 during startup, the Stop-Start or Idle-Stop control computer, at step 450 monitors the power required by the generator to keep the engine 120 spinning. When the required generator power drops below a cranking power threshold the engine state, at step 460, is defined as running and, at step 470, the Stop-Start or Idle-Stop control computer commands the generator inverter/controller to switch from the motor mode (power negative) back into the generator mode (power positive). In a fail-safe control the engine spinning is stopped after a maximum allowed spin time and a fault code is set.

In one or more implementations of the systems 100, 200, one or both of the systems 100, 200 may include one or more the following: the software resides in an STW hybrid vehicle controller that uses an SAE J1939 "CAN" control area network to interface to the electric energy storage; the systems 100, 200 include Siemens "ELFA" electric drive components including the generator, DUO-Inverter/controller, and electric propulsion motor; and other vehicle sensors and actuators; the speed is determined by reading the electric motor rpm through the motor controller; the low voltage SOC is determined from an analog to digital sensor that reads the battery voltage; the high voltage SOC is determined from the energy storage controller; the energy storage can be ultracapacitors, batteries, flywheels, or other device that stores and supplies electrical energy; the generator rpm and power level is obtained and controlled through the generator inverter/controller; the engine rpm can also be obtained from either the generator controller or the engine electronic control unit; and control of the engine 120 is performed through the CAN interface to the engine control unit.

Figure 4:
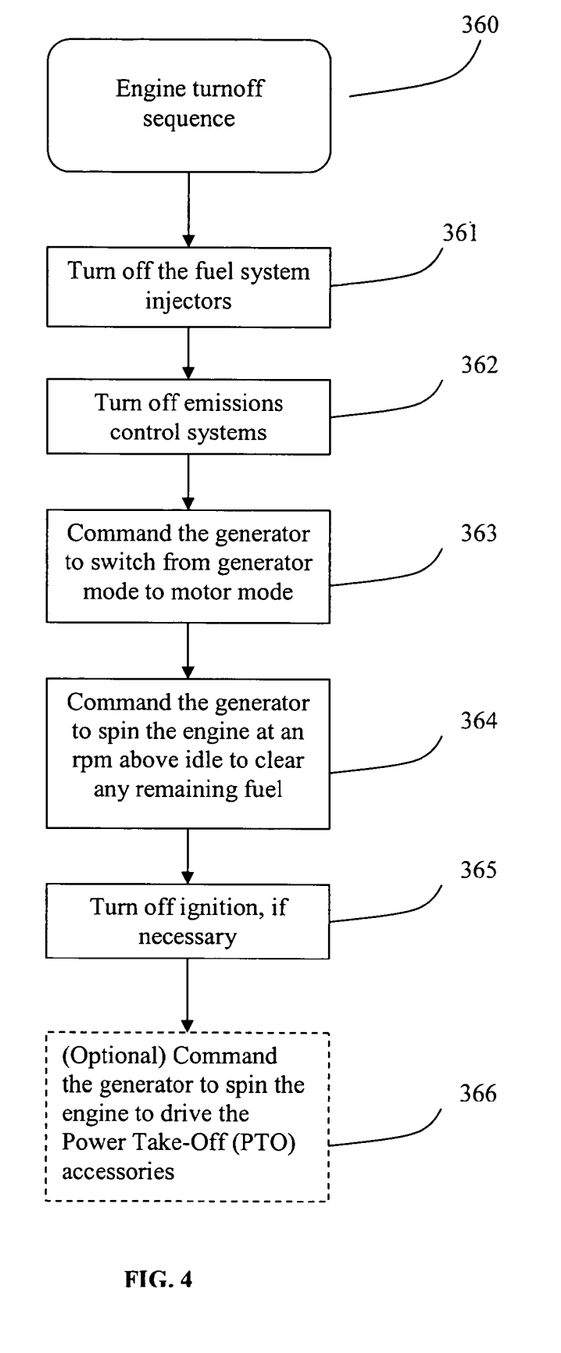
FIG. 4 is a flow chart an exemplary engine turnoff sequence.

With reference to FIG. 4, an exemplary engine turnoff or shutdown sequence 360 includes, at step 361, turning off the fuel injectors supply of fuel to the engine. The fuel pump is not turned off so as to provide the fuel pressure as will be required for engine restart. Typically, to minimize exhaust emissions there will also be some emissions control devices to be shut down like evaporative control and EGR. Thus, at step 362, the emissions control systems are turned off. At step 363, the generator is switched to motor mode to spin the engine to clear any remaining fuel and send the exhaust products to the exhaust after treatment. Thus, at step 364, the generator is commended to spin the engine at an rpm above idle to clear any remaining fuel. For a spark ignition engine, spark generation is turned off at step 365, if necessary for engine control operation. Finally, at optional step 366, the generator can be commanded to continue to spin the engine to run any PTO accessory devices with out consuming engine fuel. Such an operation is useful for slowing a vehicle during downhill travel as described by the flow diagram sequence in FIG. 5 below. Braking regeneration puts a drag on the vehicle drive line while providing power for the generator to spin the engine. The generator works against the engine compression and the power required by the PTO devices.

Figure 5:
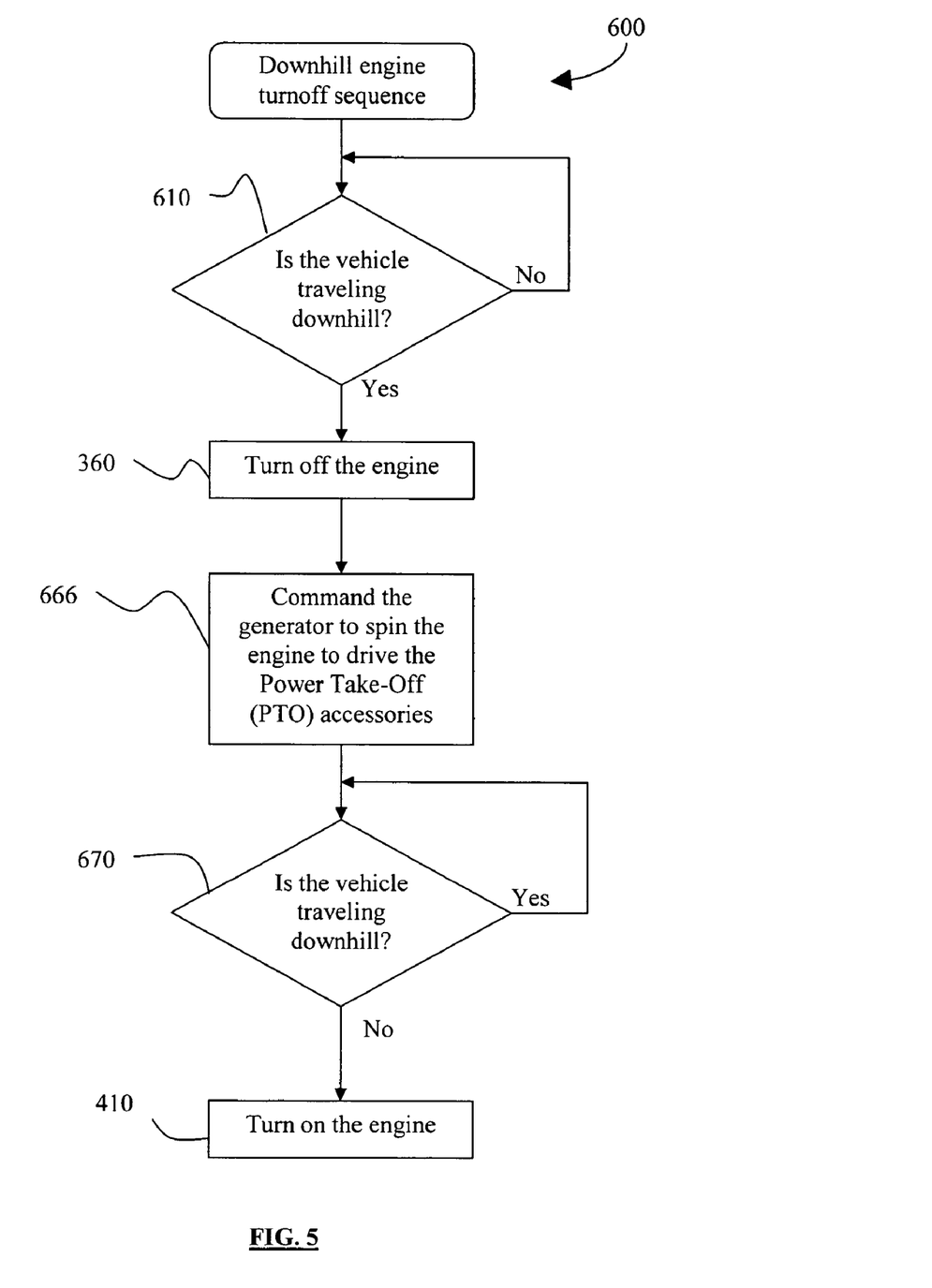
FIG. 5 is a flow chart of an exemplary engine turnoff sequence when the vehicle is traveling downhill.

With reference to FIG. 5, an exemplary downhill engine turnoff sequence 600 includes, at step 610, first determining if the vehicle is traveling downhill for a vehicle location and direction of travel along with topographic information, route information, and/or vehicle attitude information. If it is determined that the vehicle is traveling downhill, at step 350, the engine is turned off as described by the flow diagram in FIG. 4. Typically, at this point and not shown, the propulsion motor switches from motor mode to generator mode. At step 666, the generator switches to motor mode to spin the engine. This operation continues until the vehicle is no longer traveling downhill as determined in step 670. Finally, normal operation is resumed at step 410 where the engine restart sequence is initiated.

Figure 6:
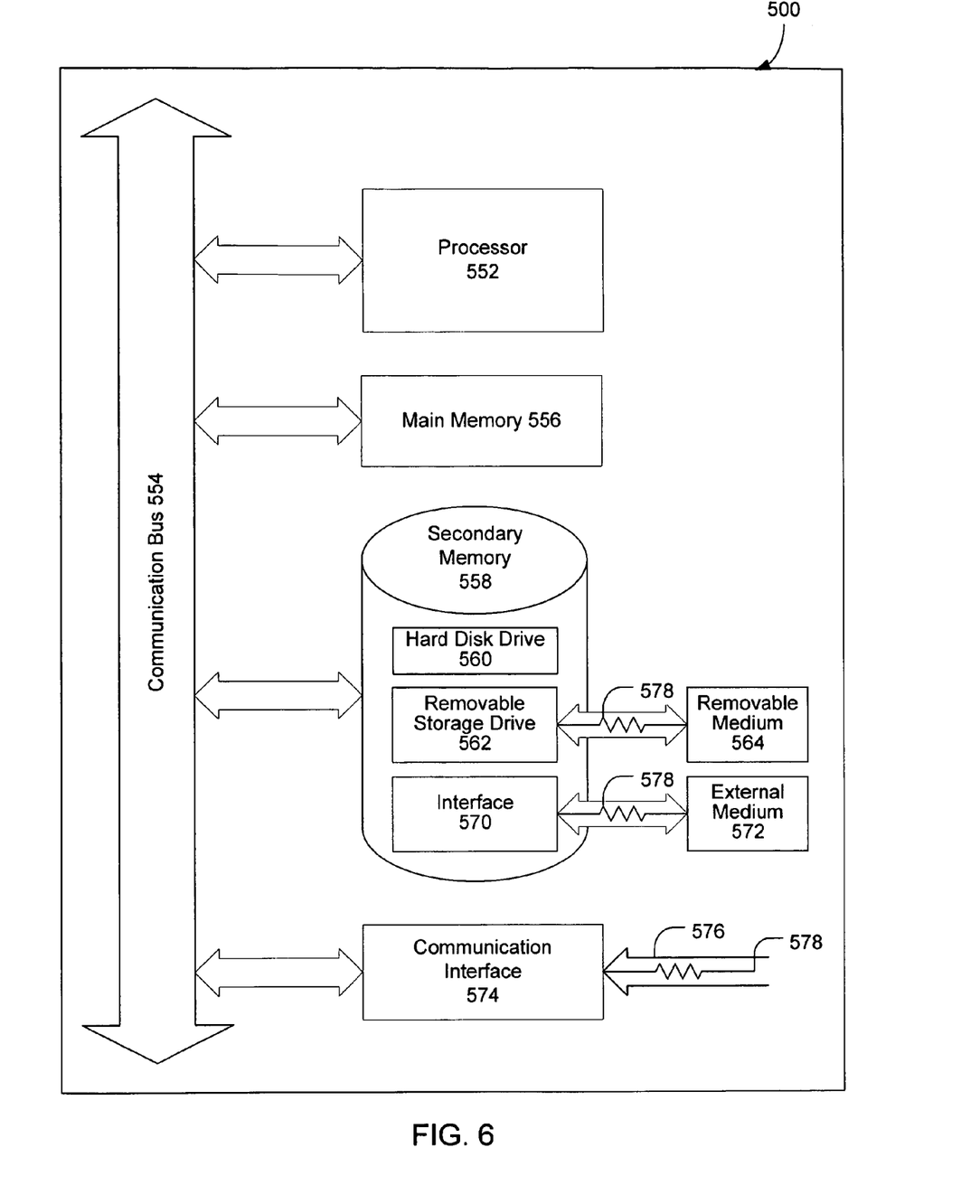
FIG. 6 is a block diagram illustrating an exemplary computer as may be used in connection with the systems to carry out the methods described herein.

FIG. 6 is a block diagram illustrating an exemplary computer 500 as may be used in connection with the systems 100, 200 to carry out the above-described methods 300, 410, 360, 600 and other functions. For example, but not by way of limitation, the computer 500 may be a digital control computer that has the physical and protocol interfaces with the vehicle control and various component computers that control and report subsystem status. However, other computers and/or architectures may be used, as will be clear to those skilled in the art.

The computer 500 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer 500. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer 500 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium or removable memory device 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer 500 as electrical communication signals 578.

In alternative embodiments, secondary memory 558 may include other similar means for allowing computer programs or other data or instructions to be loaded into the computer 500. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer 500.

Computer 500 may also include a communication interface 574. The communication interface 574 allows software and data to be transferred between computer 500 and external devices (e.g. printers), networks, or information sources. For example, computer software or executable code may be transferred to computer 500 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/internet protocol ("TCP/IP"), serial line internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer 500 to perform the various functions of the present invention as previously described.

In this description, the term "computer readable medium" is used to refer to any media used to provide computer executable code (e.g., software and computer programs) to the computer 500. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer 500.

In an embodiment that is implemented using software, the software may be stored on a computer readable medium and loaded into computer 500 by way of removable storage drive 562, interface 570, or communication interface 574. In such an embodiment, the software is loaded into the computer 500 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for efficiently controlling an engine of a heavy-duty hybrid-electric vehicle of at least 10,000 pounds Gross Vehicle Weight Rating (GVWR), the heavy-duty hybrid-electric vehicle having a generator, an inverter, a propulsion motor, a first energy storage, and a control computer, the method comprising:
   enabling a function comprising at least one of a Stop-Start and an Idle-Stop function;
   determining a first energy storage first State Of Charge;
   determining a first vehicle propulsion power requirement associated with the acceleration of the heavy-duty hybrid-electric vehicle; and,
   turning off the engine if the first energy storage first State Of Charge is above a first energy storage first State Of Charge minimum threshold and the first vehicle propulsion requirement is below a first vehicle propulsion requirement minimum threshold.

2. The method of claim 1, wherein the determining the first vehicle propulsion power requirement comprises determining whether the heavy-duty hybrid-electric vehicle is decelerating; and,
   wherein the first vehicle propulsion requirement is below the first vehicle propulsion requirement minimum threshold if the heavy-duty hybrid-electric vehicle is decelerating.

3. The method of claim 2, wherein the determining whether the heavy-duty hybrid-electric vehicle is decelerating comprises receiving deceleration information from at least one of: a position location system, a route identification system, and, an onboard vehicle attitude system.

4. The method of claim 1, wherein the turning off the engine comprises shutting off a fuel supply of the engine and leaving on an air supply of the engine.

5. The method of claim 1, wherein the heavy-duty hybrid-electric vehicle also has at least one electrically driven accessory, the method further comprising:
   generating electricity through braking regeneration; and,
   running the at least one electrically driven accessory with assistance from electricity generated by braking regeneration.

6. The method of claim 1, further comprising generating electricity through braking regeneration; and,
   wherein the determining a first vehicle propulsion power requirement comprises determining that electricity is being generated by braking regeneration.

7. The method of claim 1, wherein the first energy storage first State Of Charge is above a first energy storage first State Of Charge minimum threshold if the first energy storage first State Of Charge is greater than a minimum operating threshold to sustain an accessory power requirement during at least one of a Stop-Staff cycle and a Idle-Stop cycle.

8. The method of claim 1, further comprising:
   determining a first energy storage second State Of Charge;
   determining a second vehicle propulsion power requirement associated with the acceleration of the heavy-duty hybrid-electric vehicle; and,
   restarting the engine if the first energy storage second State Of Charge is below a first energy storage second State Of Charge minimum threshold or if the second vehicle propulsion requirement is above a second vehicle propulsion requirement minimum threshold.

9. The method of claim 8, wherein, to limit oscillations, the first energy storage second State Of Charge minimum threshold is set significantly below the first energy storage first State Of Charge minimum threshold.

10. The method of claim 8 wherein the determining the first energy storage second State Of Charge comprises determining whether the heavy-duty hybrid-electric vehicle requires more traction power than can be provided by the first energy storage, and wherein the first energy storage second State Of Charge is below the first energy storage second State Of Charge minimum threshold if the heavy-duty hybrid-electric vehicle requires more traction power than can be provided by the first energy storage.

11. The method of claim 8 wherein the determining the second vehicle propulsion power requirement comprises determining whether the heavy-duty hybrid-electric vehicle is not decelerating, and, wherein the second vehicle propulsion requirement is above the second vehicle propulsion requirement minimum threshold if the heavy-duty hybrid-electric vehicle is not decelerating.

12. The method of claim 11, wherein the determining whether the heavy-duty hybrid-electric vehicle is not decelerating comprises receiving deceleration information from at least one of: a position location system, a route identification system, and, an onboard vehicle attitude system.

13. The method of claim 8, wherein the first energy storage second State Of Charge is below a first energy storage second State Of Charge minimum threshold if the first energy storage second State Of Charge is less than a minimum operating threshold to sustain an accessory power requirement during at least one of a Stop-Start cycle and a Idle-Stop cycle.

14. The method of claim 8, wherein the restarting the engine comprises:
   switching the generator to operate as a motor; and,
   spinning the engine with the generator.

15. The method of claim 1, wherein the first energy storage comprises a high voltage energy storage.

16. The method of claim 15, wherein the high voltage energy storage comprises one or more ultracapacitors.

17. The method of claim 15, wherein the heavy-duty hybrid-electric vehicle has a second energy storage comprising a low voltage energy storage.

18. The method of claim 17, further comprising determining a second energy storage first State Of Charge; and,
   wherein the turning off the engine further comprises turning off the engine if the second energy storage first State Of Charge is above a second energy storage first State Of Charge minimum threshold.

19. The method of claim 8, wherein the first energy storage comprises a high voltage energy storage, and, wherein the heavy-duty hybrid-electric vehicle has a second energy storage comprising a low voltage energy storage, the method further comprising determining a second energy storage second State Of Charge; and,
   wherein the restarting the engine further comprises restarting the engine if the second energy storage second State Of Charge is below a second energy storage second State Of Charge minimum threshold.

20. The method of claim 1, wherein the control computer is configured to communicate over a control area network (CAN).

21. The method of claim 1, wherein the generator is nominally rated at 650 V with at least 20 kW of power.

22. The method of claim 1, wherein the propulsion motor is nominally rated at 650 V with at least 15 kW of power.

23. The method of claim 1, wherein the inverter comprises an IGBT high power switching device nominally rated at 650 V with multiple phase.

24. The method of claim 1, wherein the heavy-duty hybrid-electric vehicle is a configured as a series hybrid drive.

* * * * *